Oct. 7, 1947.  S. WRIGHT  2,428,730
GAUGING DEVICE FOR USE IN POSITIONING, MARKING, AND HOLDING TIMBER
AND FOR GUIDING THE BIT WHILST DOWEL HOLES ARE BORED
Filed March 10, 1945
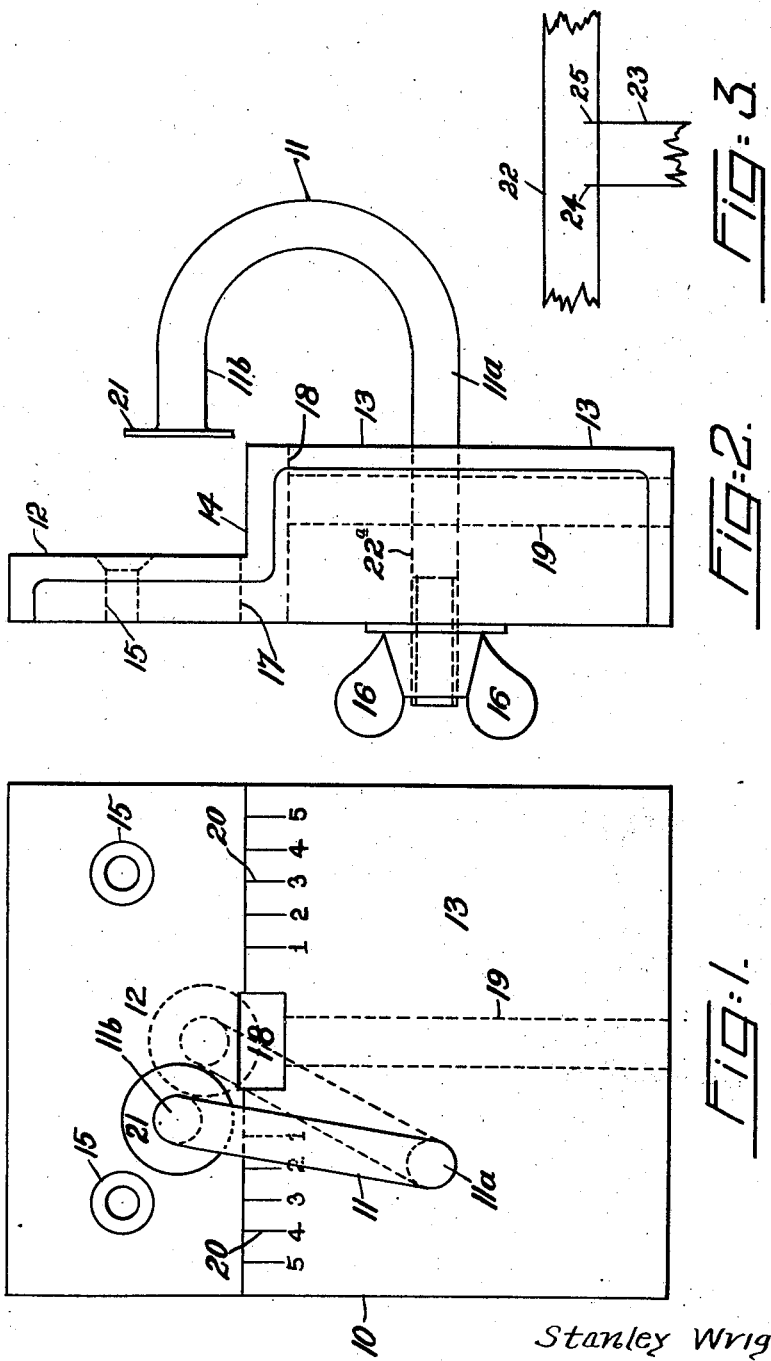
Stanley Wright
Inventor
by A. Harold Pikes
Attorney Patented Oct. 7, 1947

2,428,730

UNITED STATES PATENT OFFICE 2,428,730

GAUGING DEVICE FOR USE IN POSITIONING, MARKING, AND HOLDING TIMBER AND FOR GUIDING THE BIT WHILST DOWEL HOLES ARE BORED

Stanley Wright, Cabramatta, New South Wales, Australia, assignor of one-half to Stanley Robert Pearce, Cabramatta, New South Wales, Australia Application March 10, 1945, Serial No. 582,150
In Australia April 13, 1944

4 Claims. (Cl. 77—62)

This invention relates to the dowelling of timber and more particularly to a means for correctly positioning, marking and holding the timber and guiding the bit during the operation of boring the dowel holes.

The objects of the invention are to provide a simple, comparatively inexpensive and efficient means for reducing the time taken in making the dowel holes, to ensure the accurate positioning of the holes, to guide the bit during the boring operation and to provide an escape for the bore dust as it is ejected.

The invention comprises a horizontal table whereon the timber is held during the boring operation, a platform preferably integral with the table and having a vertical face immediately adjacent thereto, gauge markings on the horizontal face of the platform at the edge adjacent to the vertical face, a means for holding the timber firmly upon the table during the boring operation, a cylindrical passage that functions as a guide to ensure the maintenance of the bit in the same axial line throughout the boring operation and at right angles to the vertical face, and a means to enable the bore dust, i. e., the dust and chips removed by the bit or boring tool, to escape as it is ejected from the hole that is being bored in order to prevent it entering and choking the guide passage.

The table and platform are preferably integral with one another, and of cast metal. The vertical face of the platform is recessed at its longitudinal centre and in register with a hole in the casting at the bottom of the recess. A horizontal cylindrical passage is formed in the platform and at right angles to the vertical face, previously referred to, the axial line of the passage passing through the centre of the recess. Gauge markings are made along the edge of the platform, on each side of and in alignment with the recess. When the timber is placed and properly positioned upon the table it is necessary to hold it firmly in that position during the boring operation. This may be done in different ways but the preferred method consists of a U-shaped clamp having one long leg the end of which is screw threaded to receive a wing or other nut. The short leg is provided with a flat faced foot, the face being of as large an area as is practicable in order to reduce the risk of marking the timber on to which it is pressed. The long leg of the U is passed through a suitably situated vertical hole in the platform, the leg making a neat but rotatable fit with the vertical hole, so that its rotation will cause the foot to be swung into any desired position within the range of movement either on the timber when it is to be used or on the platform when out of use. This form of clamp is convenient because it permits the device to be secured at the end of a bench or the like by countersunk screws which pass through the table, the platform overhanging the end of the bench, thus permitting free access for manipulating the wing nut.

A full understanding of the invention and the manner in which it is constructed and used will be obtained from the following description wherein reference will be made to the accompanying drawings in which—

Figure 1 is a plan view.

Figure 2 is a side elevation and

Figure 3 is a diagrammatic view showing portions of a stile and rail of a door and illustrating how the rail is placed against the stile in order to make the necessary markings on the latter before it is placed upon the table, that forms part of the invention, prior to positioning, clamping and boring the dowel holes.

According to the construction illustrated in the accompanying drawing the device consists of two main parts, the metal casting 10 and the clamp 11. The casting is stepped so as to form a table 12 and platform 13 the side of the latter, adjacent to the table, being a vertical face 14 at right angles to the upper faces of both the table 12 and the platform 13. The table 12 is provided with a countersunk hole 15 to enable it to be securely fastened near the end of a bench so that the platform will project beyond the end of the bench and thus provide free access for manipulation of a wing nut 16 on the clamp 11 when necessary. The casting 10 is provided with a preferably rectangular, vertical hole 17 which is in register with a centrally positioned recess 18 in the vertical face 14. It is also provided with a horizontal cylindrical hole 19 the axial line of which passes centrally through the recess 18. Upon the upper face of the platform gauge marks 20 are cut at right angles to and adjacent to the arris formed by the vertical face 14 and the upper face of the platform 13. These gauge marks 20 are equally spaced from the respective sides of the recess 18 and are preferably numbered consecutively from the recess outwardly and similarly on each side of the recess. The clamp 11 consists of a metal rod bent to U-shape and having a long leg 11a and a short leg 11b. The end of the long leg 11a is screw threaded to receive the wing nut 16, and a metal disc 21 is rigidly secured to the extremity of the short leg 11b and concentrically therewith. The long leg 11a is passed through a suitably positioned vertical hole 22a in the platform 13 and in which it may be rotated for the purpose of moving the disc or foot 21 into either an operative position which would be vertically above the table 12 and centrally in front of the recess 18, or to an inoperative position which would be upon the platform 13. The cylindrical hole 19 forms a guide passage for a bit or other boring tool and when the timber is properly positioned upon the table 12 the clamp disc or foot will be moved to the operative position and the wing nut 16 tightened so as to hold the timber firmly in position during the boring operation. In this way the pressure on the timber is applied at the point at which the dowel hole is to be bored.

In most cases where dowelling is done the timber used is of the same thickness and the depth of the vertical face 14 will be the thickness of the timber used. This is necessary because the dowel holes are centrally positioned in the timber and the axial line of the hole bored by the bit or boring tool is fixed by the cylindrical guide 19. If dowel holes are to be formed in timber of other thickness a separate appliance according to this invention will have to be installed but it will have a vertical face of the same depth as the thickness of the timber used.

The appliance is used by placing the timber in position upon the table 12, using the gauge markings 20 for positioning, securing the timber in that position, passing the bit into guide channel 19 and boring the hole in the fixed timber by means of a brace, and afterwards by using the same gauge markings 20 for positioning and making the holes in the piece of timber to be joined to the first piece. It may also be used advantageously for making a dowel hole or holes in mitered ends of timber to be joined.

In dowelling two pieces of timber the holes in one piece must be in axial alignment with those in the other piece; accuracy is essential, but by present day methods even when care is exercised, slight variations do occur and this results either in a great strain being placed upon the dowel pins or it may even be impossible to get them to enter the respective holes in the two pieces to be joined. In some cases inaccuracies are caused by the bit following the grain of the wood and failing to centre at the correct point. With ordinary care and by moving the timber to the correct gauge markings on the device that forms the subject of this specification the holes must be properly positioned and as the timber is held firmly and the bit is rotatably held in the guide passage 19 it must enter the timber at a point in axial alignment with the guide passage.

The invention renders it comparatively easy to dowel two pieces of timber even when both the opposed surfaces are grooved, an operation which takes a considerable additional time by methods hitherto known and used because a centre must be formed for the bit. By the use of the present invention the bit will bore through the two sides of the groove until its point reaches the bottom of the groove when it will puncture the timber at that point which will be in axial alignment with the arcuate sections removed by the bit from the sides of the grooves.

The markings on two pieces of timber to be joined may be done in different ways but one example will be sufficient to illustrate how the gauge markings are used.

It will be assumed that a stile 22 (Fig. 3) and rail 23 of a door are to be dowelled. The end of the rail 23 is placed against the stile 22 at the point at which the two pieces are to be joined. The stile 22 is then marked at points 24 and 25 respectively in alignment with the sides of the rail 23, when the stile 22 may be placed upon the table 12 with the side on which markings appear seated squarely against the vertical side 14 of the platform. The stile 22 is then moved longitudinally until one of the markings is in register with the chosen gauge mark 20 on that side of the recess 18. In this position the stile is clamped and a hole may be bored as previously explained, and the bit removed from the guide passage. The stile is then unclamped and moved until the second mark on the stile is in register with the coinciding gauge mark on the other side of the recess 18 when the operation of clamping, boring, unclamping and removal of the bit is repeated. The two holes in the stile 22 have now been made and it will be removed and the rail 23 placed upon the table 12 so that its end fits snugly against the vertical side 14 of platform 13, with one longitudinal edge in register with the gauge mark used previously for positioning the stile and on the relative side of the recess in the vertical side 14 of the platform. The operations described in reference to the stile 22 are now repeated and the rail 23 then moved so that the other longitudinal edge is in register with the coinciding gauge mark on the other side of the recess 18 the rail clamped, bored, unclamped and the bit removed. The rail may now be removed and the holes in both pieces will have been made in readiness to receive the dowel pins.

I claim:

1. An appliance for use in dowelling which comprises a horizontal table parallel to and integral with a platform, a vertical face joining the adjacent ends of the table and the platform, gauge markings at right angles and adjacent to the arris formed by the vertical and horizontal faces of the platform, clamping means for securing a length of timber to the table in contact with the vertical face of the platform, and a guide passageway extending through the platform to communicate with a recess in the vertical face, the long axis of the passageway being horizontal and at right angles to the vertical face of the platform.

2. An appliance for use in dowelling as claimed in claim 1, in which the recess is centrally disposed in the vertical face of the platform and in register with an aperture through which bore dust and chips may gravitate.

3. An appliance for use in dowelling which comprises a horizontal table parallel to and integral with a platform, a vertical face joining the adjacent ends of the table and the platform, clamping means for securing a length of timber to the table in contact with the vertical face of the platform comprising an inverted U-shaped member having a long leg swivelly carried by said platform and a short leg provided with means adapted in nonclamping position to lie flat upon the platform and in clamping position to be swung around for securing the timber to the table, and a guide passageway extending through the platform to communicate with a centrally positioned recess in said vertical face, the long axis of the passageway being horizontal and at right angles to the vertical face of the platform.

4. An appliance for use in dowelling as claimed in claim 3 in which the long leg of the U-shaped member extends vertically through said platform, and means for locking said U-shaped member in any predetermined position in a horizontal plane.

STANLEY WRIGHT.

REFERENCES CITED

The following references are of record in the file of this patent:

UNITED STATES PATENTS

| Number | Name | Date |
|---|---|---|
| 917,488 | Roberts | Apr. 6, 1909 |
| 1,556,540 | Patterson | Oct. 6, 1925 |
| 2,260,784 | Morton | Oct. 28, 1941 |
| 706,392 | Corliss | Aug. 5, 1902 |
| 809,069 | Lovett | Jan. 2, 1906 |
| 1,097,153 | Wolgamood | May 19, 1914 |
| 1,438,562 | Smith | Dec. 12, 1922 |